United States Patent [19]

Graham

[11] 4,305,323
[45] Dec. 15, 1981

[54] HARMONIC CONVERSION WHEEL

[76] Inventor: Bruce L. Graham, 2621 Airpark Apartments, No. 12, Nashville, Tenn. 37206

[21] Appl. No.: 109,548

[22] Filed: Jan. 4, 1980

[51] Int. Cl.³ ............................................. G09B 15/02
[52] U.S. Cl. .................................. 84/474; 84/471 SR
[58] Field of Search ................... 84/471 SR, 473, 474, 84/485 SR

[56] References Cited

U.S. PATENT DOCUMENTS

| 854,572 | 5/1907 | Fitch | 84/474 |
| 1,804,460 | 5/1931 | Cordier | 84/474 |
| 2,649,008 | 8/1953 | Bova et al. | 84/474 |
| 3,572,205 | 3/1971 | Scholfield | 84/474 |

FOREIGN PATENT DOCUMENTS 354671 6/1922 Fed. Rep. of Germany ........ 84/474

Primary Examiner—Lawrence R. Franklin
Attorney, Agent, or Firm—Andrew S. Neely

[57] ABSTRACT

A Harmonic Conversion Wheel is disclosed comprising a circular disk, a faceplate and attaching means joined together along a common axis which is the centerpoint of said elements. By rotation of the disk about said axis and proper registration of said disk with the windows positioned in the faceplate, an artist, composer, student of music, performer or arranger has at their disposal a multitude of information regarding the law of intervals and similar musical relationships concerning tonics, chords, scales and notes within a scale. Thus, a person without analogous skills can perform, rearrange, transpose or learn music to the best of his ability while developing his own caliber of musical knowledge and expertise.

10 Claims, 2 Drawing Figures

HARMONIC CONVERSION WHEEL

BACKGROUND OF INVENTION

1. Field of Invention

This invention relates to the musical sciences and particularly to an accessory useful for the purposes of teaching or transposing music.

2. State of Prior Art

As a general proposition, artists, composers and students of music have encountered the need to relate a musical score to a different key, chord or similar transposition. Heretofore, the only known way to achieve this relationship was by years of formal musical education, performance and practice. Artists, composers and students who possessed the ability to transpose from one key, chord or tonic relationship to another have been in great demand and achieved widespread reknown.

SUMMARY OF INVENTION

Accordingly, it is an object of the present invention to provide a Harmonic Conversion Wheel which will enable anyone to quickly and easily change keys or related musical and tonic relationships, given a musical score that needs to be rearranged.

It is a further object of invention to provide a device simple in construction and operation which is efficient, lightweight and durable for the purposes of transferring, rearranging or recomposing musical scores in a quick, reliable fashion. Said device would fulfill a definite, long-felt need in this field by artists, composers and students of music, as well as performers and arrangers.

It is yet a further object of the present invention to provide a simple device capable of being used by musicians of all degrees of experience and skill. Said device should be capable in its preferred embodiment of having a reliable, dependable service life which can be frequently used in numerous situations without necessitating the purchase of a new Harmonic Conversion Wheel or related component parts except in cases of extended use, abuse or neglect by its owner.

It is still a further object of the invention to provide a device which does not require special musical skills, abilities or aptitudes to apply, practice or otherwise take advantage. It is also intended to provide a device which accomplishes significant savings of time, labor and effort of artists, composers and music students by those having need to change, transpose or rearrange musical scores. A final object of the present invention is to provide a versatile, unique device of novel construction which can be easily fabricated, inexpensively manufactured and readily mass produced in sufficient quantities to make it an economic success and commercial reality.

These and other objects of the present invention are satisfied by the present device which obviates the problems of the prior art mentioned above and which is capable of several different applications.

BRIEF DESCRIPTION OF DRAWINGS

These and other aspects of the invention will be more fully understood and appreciated from the following description and explanation of the accompanying drawings in which.

DETAILED DESCRIPTION

Figure 1:
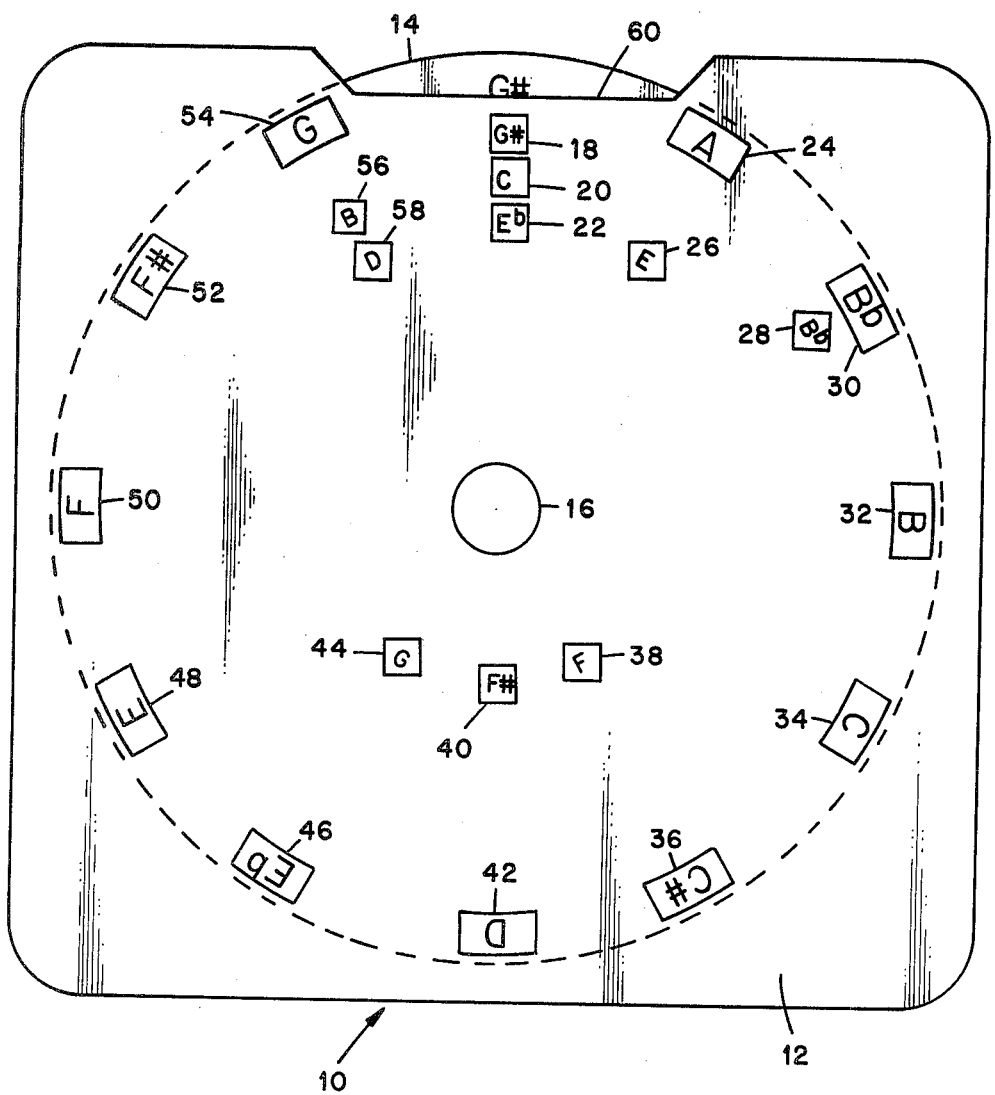
FIG. 1 is a plan view of the present invention showing the details and information available from the device.

Throughout the description that follows, like numerals refer to similar parts or features in the various drawings.

The reference numeral 10 designates the Harmonic Conversion Wheel of the present invention generally. In its preferred embodiment, it consists of a circular disk shaped member, a faceplate member, and attaching means for allowing the disk to move in a rotational manner about the attaching means with respect to the faceplate. A more complete description of the function and interaction of these elements will be found in the below given detailed specification.

FIG. 1 is a plan view showing the elements of the Harmonic Conversion Wheel in detail. The present invention 10 can be made from a suitable stiff material of construction such as pressboard, posterboard, celluloid, laminated plastic, plastic or like material. These materials have sufficient durability and reliability to withstand ordinary abuse and neglect of artists, composers and music students. They are also in ready supply, easily worked with, and simply maintained and cleaned by ordinary methods. Because these materials are lightweight as well, the instant device 10 is portable and will thus achieve widespread acceptance and use within the field of music that can be attributed to all of its features. Preliminary prototypes of this invention have been fabricated from simple cardboard which has proven to be extremely reliable, lightweight and durable. In this form, the present invention can be easily fabricated, inexpensively manufactured and readily mass produced in sufficient quantities to make it an economic success within the industry. Further, the utilization of special manufacturing processes and highly skilled labor is unnecessary to make and assemble such a device.

Referring again to FIG. 1, the present invention 10 is constructed by joining the faceplate 12 to the disk 14 by attaching means 16 such as rivet. As thus positioned, the disk 14 moves relative to the faceplate 12 in a rotational fashion, but is adequately restrained to maintain the proper registration of the disk 14 and faceplate 12 to allow correct readings of musical data through the openings in the said faceplate. Because the disk 14 has imprinted thereon an orderly and tabular arrangement of characters, a user of the present invention 10 can obtain certain useful information through the frontal openings or windows in the faceplate 12. The manner in which this information is interpreted and used will be explained in detail below.

Figure 2:
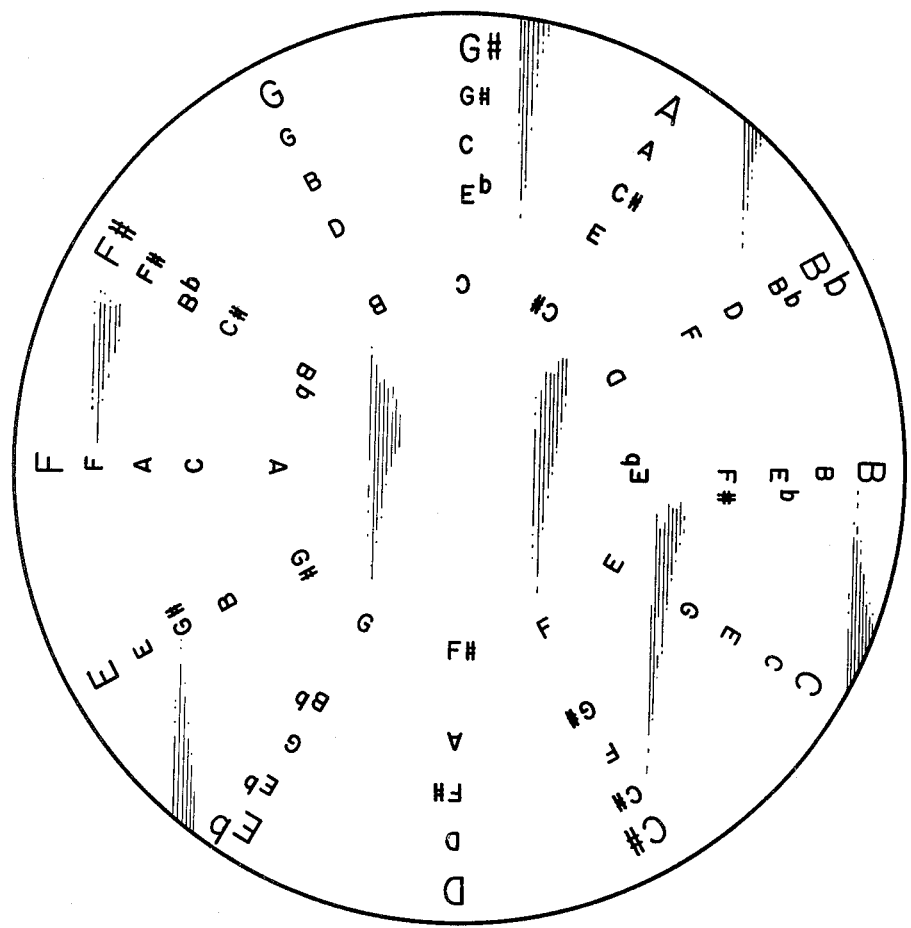
FIG. 2 is a plan view of the disk element of FIG. 1 showing the arrangement of the data located on its surface.

FIG. 2 is a plan view of the disk 14 showing the information thereon contained. Spatially disposed from the center of the disk and its outermost edge are located in columnar form certain notes or musical keys. Since there are 12 basic keys in music, there are twelve columns of data equidistantly spaced from each other around the disk. Beginning with the tonic of C at the zero degree position, the first row of data, closest to the center of the disk, is printed in the following manner at 30 degree intervals in a counterclockwise manner: C, B, B♭, A, G♯, G, F♯, F, E, E♭, D, C♯. These keys are located at the following respective angular positions taken in a counterclockwise manner: 0°, 330°, 300°, 270°, 240°, 210°, 180°, 150°, 120°, 90°, 60°, and 30°. The second row of data, next closest to the center of the disk, is similarly printed to the first row of data beginning with the tonic of E♭ at the zero degree position and proceeding counterclockwise with D at 330°, C# at 300°, C at 270°, B at 240°, B♭ at 210°, A at 180°, G# at 150°, G at 120°, F# at 90°, F at 60°, and E at 30°. The third row of data, next closest to the center of the disk, is identically printed to the first row of data beginning with the tonic of C at the zero degree position and proceeding in the same counterclockwise manner. The fourth row of data, next closest to the center of the disk, is similarly printed to the first row of data beginning with the tonic of G# at the zero degree position and proceeding in a counterclockwise manner as follows: G at 330°, F# at 300°, F at 270°, E at 240°, E♭ at 210°, D at 180°, C# at 150°, C at 120°, B at 90°, B♭ at 60°, and A at 30°. The fifth row of data, next closest to the center of the disk and furtherest removed therefrom, is similarly printed to the first row of data and is identical to the fourth row beginning with the tonic of G# at the zero degree position and proceeding in the same counterclockwise manner. The first row of data, closest to the center of the disk, is printed upside down so that when the disk is properly aligned, windows 38, 40, and 44, can be read from the Harmonic Conversion Wheel without any difficulty. The remaining four rows of data are printed rightside up in the normal manner reading from left to right and top to bottom as judged equally from the center.

In the preferred embodiment of the present invention, the attaching means 16 can be removed allowing easy and rapid replacement of the disk 14. Since the disk 14 will be readily available in commercial musical establishments, the above mentioned feature makes the present device 10 inexpensive to repair at its major wear surface and precludes any necessity for returning it to the manufacturer for routine repairs. Thus, it has a dependable service life allowing numerous applications of the same device without purchasing a new device or a component part in this day and age of planned obsolence. While some extraordinary cases of abuse, neglect or extended use without routine maintenance may result in failure necessitating replacement or extensive repairs, the present invention 10 is believed to have above average reliability for printed music accessories generally and is relatively simple in design and structure.

Further, the tabular information printed on the disk 14 can be arranged in different formats to provide information other than that described above without departing from the spirit and scope of the present invention. Thus, the present device has a unique versatility because no other presently available apparatus can provide so much information at the fingertips of an artist, composer or student of music for so many instruments. In some instances, the changed formats may involve additional rows of the same type of data being printed on the disk or constitute information pertaining to the special characteristics of the instrument being studied. Additionally, the present invention 10 could be modified to provide, in addition to manual data, electroncially codeable data to be utilized in a computer or other electronically operated memory. In this form, the present device 10 could be utilized to provide information instantaneously regarding the important inter-relationships of music. These factors are expected to make the present invention a significant commercial success within its field. Further, it can be modified or repaired directly by its owner or traditional user since significant mechanical skills or abilities are not necessary to overhaul it. Also, the tools which would be required to work on the present invention can be found in the standard home tool box.

In the music industry today, it is customary for artists, composers and students to rely on their analogous skills to rearrange or transpose music. To obtain these skills, one must be quite experienced with music, the instrument and musical or tonic relationships. This practice is deemed unsatisfactory because it is time consuming to obtain, and only the very talented are able to actively apply these analogous skills in the first place. Thus, there is a long felt need in modern society for a satisfactory device or mechanical means for performing this task. The present invention 10 fills this need quite well. The rapidly accessible information which it provides will mean considerable savings in time, effort and manpower for artists, composers and students of music. Further, the use of the present device will minimize their physical stress and mental exhaustion allowing them more time to perform or practice their desired task.

While the present invention does provide a significant amount of musical information regarding the law of intervals and other vital inter-relationships between tonics, chords, scales, and notes within a scale, it should be understood that there is no intent to undermine written music by application and use of this device. Rather, it is intended to aid a person without analogous skills to perform, rearrange, transpose or learn music to the best of his ability and thus develope his own caliber of musical knowledge and expertise. Hence, all of society would benefit from the widespread use of the present invention since music is truly the universal language.

Returning to FIG. 1, the features and related details of the faceplate 12 are shown in this plan view. From its appearance, it can readily be seen that the faceplate 12 serves two functions. First, it sufficiently covers the disk 14 to protect it from externally being damaged. Secondly, it has located within its surface a multiplicity of openings or windows through which vital information can be obtained by proper alignment of the disk 14 and the faceplate 12. This proper alignment is obtained by locating, at the exact center of the faceplate 12 and the disk 14, the attaching means 16. As thus positioned, the rotation of the disk 14 will bring significant musical data into registration with the windows located in the faceplate 12. The preferred embodiment of the present invention 10 has a slight notch or contoured opening 60 along one of the four edges of the faceplate 12 to provide ready access to the disk 14 so that it can be easily rotated. The remaining extremities of the disk 14 are protected by the edges of the faceplate 12. The particular edge in which this notch or contoured opening 60 is located is varied from type and use of the Harmonic Conversion Wheel 10. For instance, in a hand-held model, this indented surface could be located in any edge, but preferrable the top edge as shown in FIG. 1. In a larger model, such as one used for classroom instruction, the indented surface would be located in the bottom edge so that the instructor could adjust it from below, assuming it is suspended from overhead.

As designed, the present invention 10 provides a significant amount of musical information at the fingertips of the user. This presupposes that the user possesses a minimal amount of information concerning his musical instrument of how or where to note or play the twelve basic notes of music according to the peculiarities of the selected instrument. Assuming this knowledge, the user is provided with the following:

CHORDS

Information regarding formation of every major, minor, major seventh, sixth, seventh, ninth, minor seventh, minor sixth, diminished, augmented, seventh augmented fifth, and seventh diminished fifth is available in all 12 keys.

SCALE

The chromatic scale is given on the described embodiment. For those inclined to further study music, the necessary variations to the present device are straight forward and simply made by adding additional lines, characters, or features to the disk member and by making the necessary revisions in the faceplate member to display the additional data. Thus, the major, minor (melodic, harmonic), ascending and descending; or the pentonic scales could be studied. It is believed that minimal ingenuity and analogous skill will be required to acquire such knowledge with the use of the Harmonic Conversion Wheel.

KEY CONVERSION

The present device is an indespensible aid in musical composition, transposition or cohesion where technical or mental virtuosity may not be the original case.

As applied, the Harmonic Conversion Wheel enables the user to understand and appreciate complicated musical terms, relationships and analogies. For any given instrument, only a prior knowledge of how to make or play the twelve basic tones or keys of music on that particular instrument is necessary. Although helpful, a basic knowledge of chord formation, musical intervals or key conversion is unnecessary to practice the present invention since it provides all of that information through its use. By using said device, the student will learn to note and eventually to understand the mechanics of every chord and other musical relationship without learing to read music per se.

Referring again to FIG. 1, the faceplate 12 has twenty-one windows or openings located therein. Starting from the twelve o'clock position and going clockwise, the windows are identified as follows:

| Reference Numeral | Position | Disk Row | Function |
|---|---|---|---|
| 18 | 12:00 | 4 | Tonic or Keynote |
| 20 | 12:00 | 3 | 3rd interval (major) |
| 22 | 12:00 | 2 | 5th interval |
| 24 | 1:00 | 5 | Raised semitone of 1st |
| 26 | 1:00 | 2 | 5th interval augmented |
| 28 | 2:00 | 4 | 9th interval (Octave + 2nd above) |
| 30 | 2:00 | 5 | 2nd interval (major) |
| 32 | 3:00 | 5 | minor 3rd (deminished semitone of major 3rd) |
| 34 | 4:00 | 5 | 3rd interval (major) |
| 36 | 5:00 | 5 | 4th interval (perfect) |
| 38 | 5:00 | 1 | 6th interval |
| 40 | 6:00 | 1 | "7th" (deminished 7th of major scale) |
| 42 | 6:00 | 5 | Deminished 5th |
| 44 | 7:00 | 1 | (Major) 7th interval |
| 46 | 7:00 | 5 | 5th interval (perfect) |
| 48 | 8:00 | 5 | Augmented 5th |
| 50 | 9:00 | 5 | 6th interval (major) |
| 52 | 10:00 | 5 | Raised semitone of 6th |
| 54 | 11:00 | 5 | 7th interval |
| 56 | 11:00 | 3 | 3rd interval (minor) |

-continued

| Reference Numeral | Position | Disk Row | Function |
|---|---|---|---|
| 58 | 11:00 | 2 | 5th interval deminished |

As explained above, the Harmonic Conversion Wheel 10 makes all sorts of information available to the user in all twelve keys. For instance, an artist, composer or student of music can determine the major diatonic scale for the key of C which is C, D, E, F, G, A, B and C by reading these values directly from the present invention 10. This is done by placing the letter C in proper registration with the window 18 of the faceplate 12 by rotating the disk 14 until it can be read through the said window. With this alignment the following major diatonic scale can be obtained: 18, C; 30, D; 34, E; 36, F; 46, G; 50, A; 54, B; and 18, C.

With this same alignment, the user can determine the proper combinations for chord formation as follows:

| Chord | Components | | Window |
|---|---|---|---|
| Major chord or tetrachord of C (C, maj.) | | 1st | 18 |
| | | 3rd | 20 |
| | | 5th | 22 |
| Minor chord of C (C,m.) | | 1st | 18 |
| | | minor 3rd | 56 |
| | | 5th | 22 |
| C$^7$ | major chord + "7th" | | 18, 20, 22, 40 |
| C$^6$ | major chord + 6th | | 18, 20, 22, 38 |
| C$^{m7}$ | minor chord + "7th" | | 18, 56, 22, 40 |
| C$^{m6}$ | minor chord + 6th | | 18, 56, 22, 38 |
| C$^{Maj.\ 7}$ | major chord + Maj. 7th | | 18, 20, 22, 44 |
| C$^9$ | major chord + 9th added (7 + 9 is typically added to 9th chords) | | 18, 20, 22, 28 |
| C− | 1st + m 3rd + (−5) + 6th (3rd, 5th and 7th are diminished) | | 18, 56, 58, 38 |
| C+ | 1st + (+5th) + 9th (5th and octave are augmented) | | 18, 26, 28 |
| C$^{7+5}$ | 1st + 3rd + (+5) + "7th" (5th is augmented) | | 18, 20, 26, 40 |
| C$^{7-5}$ | 1st + 3rd + (−5) + "7th" (5th is diminished) | | 18, 20, 58, 40 |

To accomplish key conversion, the user may also find the present device 10 of great benefit. Assuming that an artist, composer or student of music desires to convert a piece of music from the key of C, or major chord of C, to two semitones above (D), he would accomplish this conversion by rotating the disk 14 until the letter C properly registers behind the window 18 in the faceplate 12. By then rotating said disk 14 in a counterclockwise manner exactly 60° or to the ten o'clock position, he could then read the letter D in the window 18 of the faceplate 12. This is exactly two semitones above the key of C in the chromatic scale. By aligning and rotating each consecutive keynote or chordtone in this manner, the entire piece or musical composition can be transposed two semitones above and the correct chord formation properly derived.

Further uses of the present invention are limited only by the experience and skill of the user. More complicated modal uses and the derivation of other harmonic relationships can be determined by use of the present device 10, as the user becomes more proficient in its use, more educated and experienced in the field of music, and more flexible and adaptable to music in general. Additional disks 14 may be produced with additional lines, characters, or features for deriving such information. Said disks may also be given expressive or convenient features such as having the data contained in tabular form on its surface printed in contrasting colors or type sizes. The faceplate 12 could also be modified so that its windows were in different relative positions, of different geometries, or with varying sizes and colored borders to indicate the relationship and relativity of the information produced by proper use of the Harmonic Conversion Wheel. On smaller models, a magnifying glass or feature might also be installed in the windows of the faceplate to aid in the reading of the data. Depending upon the peculiar design of the selected instrument and the preferred "color" of the chordtone desired, additional modifications and variations to both the faceplate and the disk could be made to suit the particular situation. Further, the faceplate 12 might have all of the information printed on its surface which is basic to explain and interpret the use and information obtainable from each window. As an alternate, the Harmonic Conversion Wheel might be made with a backplate or similar surface which would contain such information and which would also protect the extremities of the disk 14. While this backplate is not essential to the practice of the present invention, it is believed to be desireable and the preferred embodiment contains such an additional structural element as a convenience. It is further anticipated that an instruction sheet, pertaining to the various musical instruments, would also be inclosed with the Harmonic Conversion Wheel at the time of its sale so that more detailed and specific instructions can be given to its users.

As thus designed, manufactured and used, the Harmonic Conversion Wheel provides a quick efficient tool to the artist, composer or student of music. This apparatus has proven to be extremely versatile, reliable and efficient in experimental testing on the piano and guitar. It may be mass produced in sufficient quantities to assure low and reasonable production costs for the manufacturer which can be passed along to the retail outlet. Its simplicity in design, uncomplicated structure and practicality assure widespread use and acceptance by the music industry justifying inventoring of the Harmonic Conversion Wheel and component parts by retailers who supply to the trade. Further, it is believed that the present device will appeal to producers of sheet music, manufacturers of musical instruments, and owners of retail music establishments to the extent that the present invention could achieve widespread acceptance and use as an advertising or promotional item.

From the foregoing description and reference to the accompanying drawings, it is believed that a clear, precise and comprehensive understanding of the construction, operation, utilization and the advantages of the present device may be had by one normally skilled in the pertinent art of music and related accessories.

While the present invention has been illustrated and described herein with respect to a certain specific embodiment, it will be appreciated by those skilled in the art that many adaptations, modifications or departures can be made within the spirit and scope of the present invention. Accordingly, it is intended by the appended claims to cover all such adaptations, modifications or departures as are the equivalents of the herein illustrated and described Harmonic Conversion Wheel.

What is claimed and desired to be secured by Letters Patent from the United States Patent Office is:

1. A harmonic conversion wheel for quickly and reliably providing a multitude of information regarding the interrelationships of music to the user, comprising:
    a disc having a center point, a first circle of twelve note symbols printed on said disc about the center point of said disc and being a chromatic scale of music;
    a second circle of twelve note symbols printed on said disc about the center point of said disc and being a chromatic scale of music, said second circle being disposed concentrically with respect to said first circle with the note symbols of said first and second circles being arranged in twelve radial columns radiating from the center point of said disc, each note symbol in said second circle being four semitones upscale from the note symbol in the same column in said first circle;
    a third circle of twelve note symbols printed on said disc about the center point of said disc and being a chromatic scale of music, said third circle being disposed concentrically with respect to said first and second circles with the note symbols of said third circle being arranged in said twelve radial columns radiating from the center point of said disc, each of said note symbols in said third circle being three semitones upscale from the note symbols in the same column in said second circle;
    a face plate rotatably attached to the center point of said disc so that said disc is rotatable with respect to said face plate;
    first, second and third apertures formed in said face plate in a row oriented on a radius extending from the center line of said disc and being disposed to selectively reveal one of said radial columns of note symbols of said first, second and third circles, said disc being rotatable so that any one of said twelve radial columns of note symbols may be selectively positioned in said first, second and third apertures, the note symbols being disposed in said first, second and third apertures being the major chord of the note symbol disposed in the first aperture; and
    a fourth aperture formed in said face plate in a position to reveal a note symbol in said second circle in a column adjacent to the column of note symbols disposed in said first, second and third apertures, said fourth aperture being positioned to disclose the note symbol that may be substituted for the note symbol disclosed in said second aperture to compose the minor chord of the note disclosed in said first aperture.

2. The harmonic conversion wheel of claim 1 further comprising a fifth aperture formed in said face plate in a position to reveal a note symbol in said third circle in a column adjacent to the column of note symbols disposed in said first, second and third apertures, said fifth aperture being positioned to disclose the note symbol that may be substituted for the note symbol disclosed in said third aperture to compose the diminished fifth chord of the note disclosed in said first aperture.

3. The harmonic conversion wheel of claim 1 further comprising a fifth aperture formed in said face plate in a position to reveal a note symbol in said third circle in a column adjacent to the column of note symbols disposed in said first, second and third apertures, said fifth aperture being positioned to disclose the note symbol that may be substituted for the note symbol disclosed in said third aperture to compose the augmented fifth chord of the note disclosed in said first aperture.

4. The harmonic conversion wheel of claim 1 further comprising a fifth aperture formed in said face plate in a position to reveal a note symbol in said first circle in a column two semitones upscale from the column of note symbols disposed in said first, second and third apertures, said fifth aperture being positioned to disclose the note symbol that may be added to the note symbols disclosed in said first, second and third apertures to compose the ninth above chord of the note disclosed in said first aperture.

5. The harmonic conversion wheel of claim 1 further comprising:
 a fourth circle of twelve note symbols printed on said disc about the center point of said disc and being a chromatic scale of music, said fourth circle being disposed concentrically with respect to said first, second and third circles;
 a fifth aperture formed in said face plate in a position to reveal a note symbol of said fourth circle that may be added to the note symbols disclosed in said first, second and third apertures to compose the sixth chord of the note disclosed in the first aperture;
 a sixth aperture formed in said face plate in a position to reveal a note of said fourth circle that may be added to the notes disclosed in said first, second and third apertures to form the dominant seventh chord of the note disclosed in said first aperture; and
 a seventh aperture formed in said face plate in a position to reveal a note of said fourth circle that may be added to the note symbols of said first, second and third apertures to compose the major seventh chord of the note disclosed in said first aperture.

6. The harmonic conversion wheel of claim 1 further comprising:
 a fourth circle of twelve notes symmetrically printed on said disc about the center point of said disc and being a chromatic scale of music, said fourth circle being disposed concentrically with respect to said first, second and third circles with the note symbols of said fourth circle being arranged in said twelve radial columns of note symbols radiating from the center point of said disc, the note symbols of said fourth circle being inverted with respect to the note symbols of the first, second and third circles of a corresponding column, each note symbol in said fourth circle being three semitones downscale from the note symbol in the same column in said third circle;
 a fifth aperture formed in said face plate in a position to reveal a note symbol of said fourth circle that may be added to the note symbols disclosed in said first, second and third apertures to compose the sixth chord of the note disclosed in the first aperture;
 a sixth aperture formed in said face plate in a position to reveal a note of said fourth circle that may be added to the notes disclosed in said first, second and third apertures to form the dominant seventh chord of the note disclosed in said first aperture; and
 a seventh aperture formed in said face plate in a position to reveal a note of said fourth circle that may be added to the note symbols of said first, second and third apertures to compose the major seventh chord of the note disclosed in said first aperture.

7. The harmonic conversion wheel of claim 1 further comprising:
 an exterior circle of twelve note symbols printed on said disc about the center point of said disc and being a chromatic scale of music, said exterior circle being disposed concentrically and exterior of said first, second and third circles with the note symbols of the exterior circle being arranged in said twelve radial columns radiating from the center point of said disc, each note symbol in said exterior circle being identical to the note symbol in the same column in the first circle; and
 a plurality of apertures formed in said face plate and being positioned to reveal every note symbol of the exterior circle when any radial column of note symbols is disclosed in said first, second and third apertures.

8. The harmonic conversion wheel of claim 7 further comprising a notch formed in said face plate to expose said disc so that the user may manipulate that portion of the disc disposed in the notch to rotate the disc.

9. The harmonic conversion wheel of claim 8 further comprising:
 a fourth circle of twelve notes symmetrically printed on said disc about the center point of said disc and being a chromatic scale of music, said fourth circle being disposed concentrically with respect to said first, second and third circles with the note symbols of said fourth circle being arranged in said twelve radial columns of note symbols radiating from the center point of said disc, the note symbols of said fourth circle being inverted with respect to the note symbols of the first, second and third circles of a corresponding column, each note symbol in said fourth circle being three semitones downscale from the note symbol in the same column in said third circle;
 a fifth aperture formed in said face plate in a position to reveal a note symbol of said fourth circle that may be added to the note symbols disclosed in said first, second and third apertures to compose the sixth chord of the note disclosed in the first aperture;
 a sixth aperture formed in said face plate in a position to reveal a note of said fourth circle that may be added to the notes disclosed in said first, second and third apertures to form the dominant seventh chord of the note disclosed in said first aperture; and
 a seventh aperture formed in said face plate in a position to reveal a note of said fourth circle that may be added to the note symbols of said first, second and third apertures to compose the major seventh chord of the note disclosed in said first aperture.

10. The harmonic conversion wheel of claim 1 further comprising:
 a fifth aperture formed in said face plate in a position to reveal a note symbol in said third circle in a column adjacent to the column of note symbols disposed in said first, second and third apertures, said fifth aperture being positioned to disclose the note symbol that may be substituted for the note symbol disclosed in said third aperture to compose the diminished fifth chord of the note disclosed in said first aperture;

a sixth aperture formed in said face plate in a position to reveal a note symbol in said third circle in a column adjacent to the column of note symbols disposed in said first, second and third apertures, said sixth aperture being positioned to disclose the note symbol that may be substituted for the note symbol disclosed in said third aperture to compose the augmented fifth chord of the note disclosed in said first aperture; and a seventh aperture formed in said face plate in a position to reveal a note symbol in said first circle in a column two semitones upscale from the column of note symbols disposed in said first, second and third apertures, said seventh aperture being positioned to disclose the note symbol that may be added to the note symbols disclosed in said first, second and third apertures to compose the ninth above chord of the note disclosed in said first aperture.

* * * * *